June 25, 1957 H. B. LAW 2,797,257

COLOR TELEVISION CAMERAS

Filed July 26, 1954

INVENTOR.
HAROLD B. LAW
BY
[signature]
ATTORNEY

United States Patent Office 2,797,257

Patented June 25, 1957

2,797,257

COLOR TELEVISION CAMERAS

Harold B. Law, Princeton, N. J., assignor to Radio Corporation of America, a corporation of Delaware Application July 26, 1954, Serial No. 445,508

5 Claims. (Cl. 178—5.4)

The present invention relates generally to color television and more particularly to novel improvements in color television cameras.

While many of the cameras presently in use for the pickup of simultaneous color television signals are of the three-tube variety, there have been proposed color television pickup tubes of a type such that only one is required to simultaneously derive a plurality of component color signals. In such a color television pickup tube, component color image signals may be derived, for example, from a plurality of interleaved conducting signal strips, each acting as a signal plate for a respective strip portion of a scanned mosaic charged in accordance with a particular one of the component colors. As employed in a three-color television system, for example, signals representing respectively red, green and blue component colors are derived from three separate output leads respectively connected to spaced ones of the interleaved conducting strips. A pickup tube of this type is described in U. S. Patent No. 2,446,249, issued on August 3, 1948, to Alfred C. Schroeder.

Another example of a single camera tube for simultaneously deriving a plurality of component color signals is a pickup tube of a photoconductive type which includes a target comprising a glass base, a plurality of red, green and blue filter strips deposited thereon and interleaved in a predetermined sequence; a plurality of optically transparent, electrically conductive strips laid down on the filter strips such that a given conductive strip is superimposed upon a given one of the said filter strips; a continuous layer of photoconductive material, such as porous antimony sulphide, deposited over the conductive strips, and respective red, blue and green signal bus bars connected to the appropriate ones of said conductive strips. As such a target is scanned by a cathode ray beam each bus bar is supplied its component color signal from the signal strips associated therewith in response to the discharge of those portions of the target which received an image representative charge as light of the respective component color passed through the optical filter strips associated therewith.

In accordance with the present invention, additional space for the "strips" of a color pickup tube target, such as those described above, may be obtained without enlarging the active target surface area. In accordance with embodiments of the present invention such results are achieved through the use of an anamorphotic optical system in the camera optical system, and the revision of the shape of the active target surface from the conventional aspect ratio rectangle to a more advantageous shape.

Through use of embodiments of the present invention, the number of strip structures per inch in a color pickup tube target may be substantially increased (thus raising the limit on resolution set by the strips) without decreasing the width of the strips and without increasing the active target surface area. Also, the individual strip structures may be increased in width (to ease target fabrication difficulties), without decreasing the number per inch and without increasing the active target surface area. Similarly, the active target surface area may be reduced (to lessen target lag problems) without decreasing the individual strip width, and without decreasing the number per inch. At the receiver, the conventional aspect ratio of 4:3 may be undisturbed, appearing with all dimensions undistorted.

Accordingly it is a primary object of the present invention to provide a novel and improved color television camera.

It is an additional object of the present invention to provide an improved color television camera utilizing the principles of anamorphosis to improve attainable resolution without increasing the precision required in the pickup tube target construction, and without introducing deleterious time lag effects.

It is a further object of the present invention to provide an improved color camera, for which pickup tube target construction problems may be eased without degrading attainable resolution or enhancing target lag.

It is another object of the present invention to provide an improved single-tube simultaneous color camera whereby camera tube target lag effects may be minimized without unduly limiting attainable resolution and without enhancing target construction difficulties.

Other objects and advantages of the present invention will be readily apparent to those skilled in the art upon a reading of the following detailed description and an inspection of the accompanying drawings in which.

Figure 1:
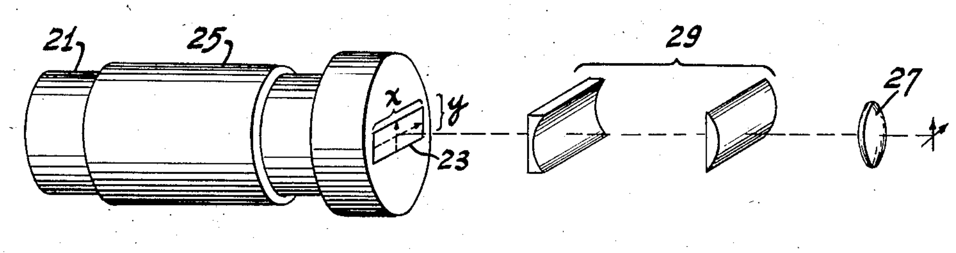
Figure 1 illustrates a color television camera utilizing the principles of an embodiment of the present invention.

Referring to Figure 1 in more detail, a camera arrangement in accordance with the principles of the present invention is illustrated therein. A color pickup tube 21, having a photoconductive type target 23, serves as the image pickup device, and may for example be of the general type disclosed in the co-pending application of Paul K. Weimer, Ser. No. 344,497, filed March 25, 1953. Details of the filter and signal strip structure of the target 23, as well as other details of the pickup tube are not illustrated in this view. However, it may be noted from the perspective view of Figure 1 that the ratio of horizontal target dimension "$x$" to the vertical target dimension "$y$" is in excess of the conventional television aspect ratio of 4:3. It may be assumed that in operation of the pickup tube 21, the deflection yoke 25 is suitably energized to produce a scanning raster that substantially fills the target area, i. e. develops a scanning raster having an aspect ratio of $$\frac{x}{y}>\frac{4}{3}$$

In accordance with the principles of the present invention, the optical system associated with the pickup tube 21 comprises, in addition to the usual camera lens system 27, an anamorphoser 29. The illustrated anamorphoser 29, comprising a pair of paraxial cylindrical lenses, one diverging and one converging and having different magnification powers, is but one of a number of known optical lens arrangements for achieving anamorphotic effects. Reference may be had to the following British patents for examples of other optical systems of the anamorphotic type: No. 8,512 (1898), Rudolph; No. 343,512, Douglass; No. 354,843, Williams; No. 356,955, H. Chretien; and No. 351,927, H. Chretien.

The desired effect of including the anamorphoser 29 in the camera optical system, whatever the particular form taken by the anamorphoser, is the controlled deformation of the image focused upon the target 23, resulting in an image thereon having its dimensons in one direction expanded relative to its dimensions in the direction perpendicular thereto. In the particular embodiment illustrated in Figure 1, the anamorphotic distortion is such as to produce a relative expansion of dimensions in the horizontal direction with respect to dimensions in the vertical direction.

Figure 2:
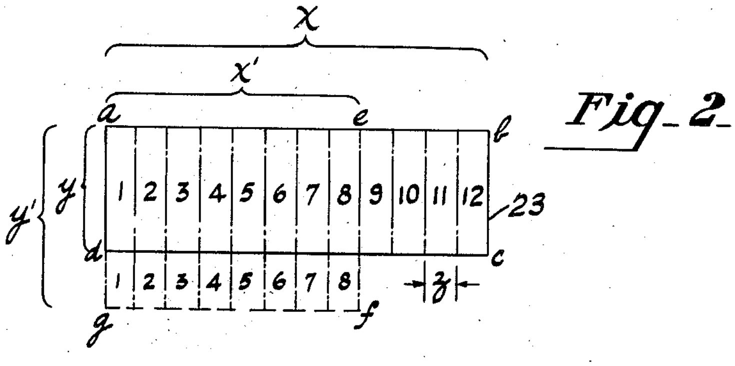
Figures 2, 3 and 4 illustrate advantages of the present invention via comparisons of a camera tube target surface in accordance with an embodiment of the present invention with conventionally shaped camera tube target surfaces.
Figure 3:
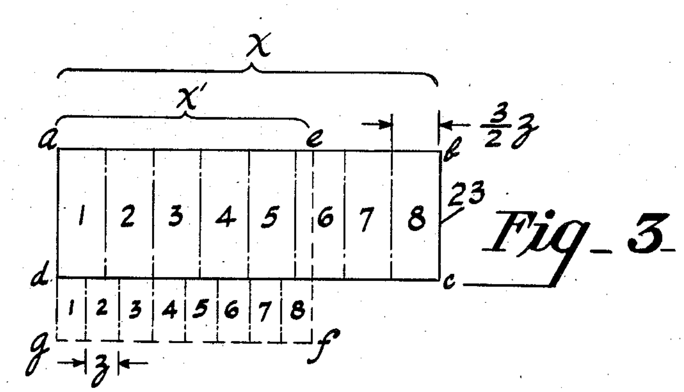
Figure 4:
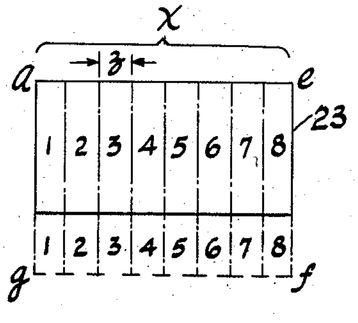

The advantages which result from effecting such a distortion of the image focused upon the pickup tube target 23, and of choosing the shape of the pickup tube target 23 to conform to such image distortion, will be more readily appreciated upon a consideration of Figures 2, 3 and 4.

Figure 2 illustrates a plan view of a pickup tube target 23 having an aspect ratio, $$\frac{x}{y}$$

greater than the conventional television aspect ratio of 4:3. In particular, the pickup tube target 23 illustrated in Figure 2 has an aspect ratio of 3:1. As noted previously, simultaneous color pickup tubes of the type disclosed in the aforementioned Weimer application, Ser. No. 344,497, include a series of substantially parallel optical filter strips, generally disposed to lie in the "vertical" direction in normal pickup tube operation. The dot-dash lines in Figure 2 represent the boundaries of such optical filter strips in the structure of pickup tube target 23. As illustrated, twelve such optical filter strips, of a width "$z$," are fitted within the width "$x$" of the target 23. A rectangle, *aefg*, partially outlined by dotted lines in Figure 2, represents the shape of a target having the conventional aspect ratio of 4:3 and encompassing the same area as the rectangle *abcd* defined by the novel target 23. As indicated only eight optical filter strips of width "$z$" fit within the width $x'$ of the conventionally shaped target.

The purpose of the foregoing illustration is a demonstration that for a predetermined target area and a predetermined filter strip width, use of the anamorphoser and reshaping of the pickup tube target in accordance with the principles of the present invention permit the use of a greater number of optical filter strips over the width of the target image. It will be appreciated that the limit of resolution imposed by the filter strip structure of the target may thus be increased without increasing the target area and without decreasing the strip widths. Thus the limit on resolution set by the camera tube target strip structure in the image pickup operations may be increased without introducing the discharge or time lag problems that result from the use of relatively large area photoconductive target, and without rendering the target fabrication problem more difficult by using a finer strip structure.

Figure 3 illustrates, on the other hand, that through use of the principles of the present invention, the width of the filter strip structures employed in the target 23 may be increased, thus simplifying the target fabrication difficulties, without increasing the target area, and yet retaining the same number of filter strip structures, i. e. not decreasing the limit on resolution set by such filter strip structures. In the particular example illustrated in Figure 3 the pickup tube target 23 encompasses eight filter strips of a width "$\frac{3}{2}z$" within its width "$x$," the strips thus being greater in width by 50% than the filter strips of the same number encompassed within the width $x'$ of the conventional target rectangle *aefg*.

Figure 4 illustrates an other facet of the advantages realized through use of the present invention, by demonstrating that the area of the pickup tube target 23 may be decreased in accordance with the present invention without decreasing the individual strip width and without decreasing the number of strips. In the particular example illustrated in Figure 4, eight filter strips of width "$z$" are encompassed within the width "$x$" of a pickup tube target 13 shaped in accordance with the principles of the present invention, though the surface area of the target 23 is 50% less than the area of a conventionally shaped target rectangle *aefg* encompassing a similar number of strips of similar width within its width "$x$." It will of course be appreciated that the examples of strip numbers per target shown in the foregoing figures were chosen for convenience of illustration only, and that in actual practice the number of strips utilized in a color pickup tube target will usually be greatly in excess of such numbers.

From the foregoing description of an illustrative embodiment of the present invention and a consideration of advantages flowing from its use, it will be appreciated that the present invention proposes a simple solution to the conflicting problems of target lag, resolution limitations set by strip structures, and target fabrication difficulties which may inhere in the use of simultaneous color pickup tubes employing strip-type targets. It will be appreciated, however, that the principles of the present invention may be extended to pickup tubes other than those particularly described. It will also be appreciated that while the invention has been particularly described with respect to the relative expansion of the target image in a horizontal direction, it is equally applicable to the solution of problems wherein expansion of the target image in the vertical direction is desired, as where the strip structures of the target are disposed to lie in a "horizontal" direction.

It should be noted that practice of the present invention need have no effect on, or in any way alter, the aspect ratio of the reproduced television image. Also, practice of the present invention in the pickup tube operation requires no complementary use of anamorphotic optical systems in the image reproducing operations.

Having thus described my invention, what is claimed is:

1. A color television camera comprising a color television pickup tube, said pickup tube including a light responsive target, said target having a light responsive surface area defined by a rectangle having an aspect ratio greater than 4:3, and an optical system for focusing an image of a scene to be televised upon said target surface area, said optical system including an anamorphoser for expanding said image in a single direction substantially parallel to the longer sides of said rectangle.

2. A color television camera comprising in combination an image pickup tube including a light responsive target comprising a plurality of substantially parallel conducting strips, and a lens system for focusing an image upon said target, said lens system including an anamorphoser for expanding said focused image in one direction only, said one direction being substantially perpendicular to said plurality of parallel strips.

3. A color television camera comprising the combination of an image scanning device having a light responsive target including a structure of substantially parallel strips, a spherical lens system for focusing an image upon said target, and an anamorphotic lens system cooperating with said spherical lens system for expanding the dimensions of the image focused upon said target in a direction substatially perpendicular to said strips relative to such dimensions in a direction parallel to said strips.

4. A combination in accordance with claim 3 wherein said target is provided with an active light responsive surface area having an aspect ratio greater than 4:3.

5. A color television camera comprising in combination a color pickup tube including a target having an active light responsive surface area of substantially rectangular shape, and means for developing a scanning raster on said target which essentially fills said active surface area, the ratio of the horizontal dimension of said scanning raster to the vertical dimension of said scanning raster being greater than 4/3, a collecting lens system adapted to focus an image upon said target, and an additional cylindrical lens system disposed between said collecting lens system and said target for expanding the horizontal dimensions of said image relative to the vertical dimensions thereof.

References Cited in the file of this patent

UNITED STATES PATENTS

| | | |
|---|---|---|
| 1,829,634 | Chretien | Oct. 27, 1931 |
| 2,389,646 | Sleeper | Nov. 27, 1945 |
| 2,603,706 | Sleeper | July 15, 1952 |